United States Patent [19]

Plankenhorn

[11] Patent Number: 4,539,462

[45] Date of Patent: Sep. 3, 1985

[54] ROBOTIC LASER BEAM DELIVERY APPARATUS

[75] Inventor: Daniel J. Plankenhorn, Palo Alto, Calif.

[73] Assignee: Westinghouse Electric Corp., Pittsburgh, Pa.

[21] Appl. No.: 460,346

[22] Filed: Jan. 24, 1983

[51] Int. Cl.³ .................. G02B 7/18; B23K 26/02
[52] U.S. Cl. .................. 219/121 LV; 901/6; 350/486; 350/623
[58] Field of Search .......... 350/486, 574, 577, 301, 350/289, 6.9, 543, 544, 540; 219/121 LU, 121 LV, 121 LW, 121 LX; 901/6, 8, 42, 50; 414/917

[56] References Cited

U.S. PATENT DOCUMENTS

| | | | |
|---|---|---|---|
| 1,492,583 | 5/1924 | Steinle | 350/544 |
| 3,216,317 | 11/1965 | Nail | 350/301 |
| 3,651,256 | 3/1972 | Sherman et al. | 350/6.9 |
| 3,658,406 | 4/1972 | Karube et al. | 350/574 |
| 3,659,926 | 5/1972 | Charbonneau | 350/486 |
| 3,769,608 | 10/1973 | Vargardy | 350/486 |
| 4,161,366 | 7/1979 | Bol et al. | 350/6.9 |
| 4,174,154 | 11/1979 | Kawasaki | 219/121 LV |
| 4,359,308 | 11/1982 | Nakajima et al. | 414/917 |

FOREIGN PATENT DOCUMENTS

| | | | |
|---|---|---|---|
| 73003 | 6/1980 | Japan | 350/486 |
| 590485 | 8/1977 | Switzerland | 350/574 |

OTHER PUBLICATIONS

Gary S. Vasilash, "At Coherent . . . ", *Manufacturing Engineering*, Mar. 1981, pp. 84–85.
Robert K. Peterson, "Performance Improvements in Laser Beam Recorders", IEEE, May 1979, pp. 185–190.

*Primary Examiner*—Jon W. Henry
*Attorney, Agent, or Firm*—Thomas R. Trempus

[57] ABSTRACT

A light beam directing apparatus is described which permits a reflected collimated beam of light, such as a laser, to be directed in a path which comprises a plurality of straight segments. Each segment of the beam is associated with a segment of a robot's arm in a fixed spatial relationship.

9 Claims, 4 Drawing Figures

ROBOTIC LASER BEAM DELIVERY APPARATUS

BACKGROUND AND SUMMARY OF THE INVENTION

The present invention relates generally to an optical system for delivery of a collimated beam of light in conjunction with automatic equipment and, more specifically, to a laser beam-directing joint for use in the field of robotics.

High powered lasers are ideally suited to be used as a source of heat in various material processing applications which include the vaporization of materials, such as in drilling and cutting operations. Lasers are also applicable to procedures, such as welding or surface cladding of metals, which require the melting of materials. Also, the temperature of solid phase materials can be varied, by use of the laser, in hardening and annealing operations.

The thermal effects which are experienced by materials when exposed to the laser beam are primarily dependent on the intensity of laser energy, the absorptivity of the material and the length of time during which the material is exposed to the laser beam. Precise control over these parameters determines the resulting change in the phase or the state of the material. Usually, when lasers are used in processes such as welding, cutting and surface treatment, the area of the workpiece to be processed is orientated in such a way that it is nearly normal to the laser beam with the beam impinging squarely on its surface. This configuration optimizes the absorptivity of the material and facilitates its heating. Generally, the laser and the workpiece are caused to move relative to each other. This relative motion can be accomplished in two ways. First, the beam can be traversed over a stationary workpiece. Second, the workpiece can be manipulated under a fixed laser beam. The former method requires that the laser beam be moved either by mounting the laser on a movable device or by directing the beam from a fixed laser to the workpiece by use of a movable optical system. The latter method requires the use of a workpiece-manipulating device.

Generally the latter method is employed. Most present systems which use the laser for material processing employ a fixed laser beam along with apparatus that is capable of manipulating the workpiece. This manipulation of the workpiece usually incorporates linear or rotational movement of the part and exploitation of the part's symmetry. Symmetrical or simple parts can be processed by machines having one or two axes of motion, but any moderately complex workpiece requires a part manipulating machine which has the capability of providing four or five axes of motion. The required manipulations of such workpieces, along with the general requirement that the laser beam impinge the working surface normally, are difficult to achieve with currently available part handling devices. Furthermore, these devices are usually made for specific parts and with dedicated hardware. Therefore, they are not readily retooled when changes in part shape and dimension occur. Other disadvantages of this type of equipment are that large, cumbersome parts are difficult to position accurately and repeatedly and have significant inertial effects when moved. Also, due to part geometry, obstructions may occur which prevents a clear "line of sight" between the laser beam source and the working surface of the workpiece.

Machines which are designed to produce a specific product are only economically feasible if a large number of parts are to be produced. Simple economics often preclude smaller batch operations. Therefore, a highly versatile system with laser beam delivery optics is needed which is capable of processing workpieces that have complex shapes and sizes in small batch quantities with minimum required retooling when the configuration of the workpiece changes.

The present invention permits the use of industrial robotic technology to be used in laser beam delivery applications. The use of a number of articulated mirrors allows the laser beam to comply synchronously with movements of the robot's manipulator. Therefore, the manipulator can then deliver a focused beam to any point within the robot's geometric range and move the beam along a contoured path with a controlled velocity.

Recent developments in the field of laser utilizing robotics incorporate an articulated laser-directing arm with mirrors disposed at its joints to reflect the light beam along the arm's segments. An example of recent articulated beam-directing optics is described in "At Coherent: advanced lasers and new ideas in robotics" by Gary S. Vasilash, Manufacturing Engineering, March, 1981, pp. 84–85 in which an optical articulated arm is illustrated and described. This arm provides a light path from a stationary laser to an end-effector which contains beam focusing optics. The end-effector is attached to a robot arm which is capable of automatic operation. The light directing arm and the robot arm are connected only at the end-effector and the light directing arm's joints are each free to move in order to permit the laser directing arm to span the distance between the laser and the point in space at which the robot arm has positioned the end-effector. This configuration is analogous to a dentist's drill-support mechanism in its principle of operation. The drill bit is comparable to the laser system's end-effector and the dentist's arm is analogous to the robot arm. The drill-support mechanism comprises a plurality of articulated joints which can each move in such a way that the linkage system spans the distance between the motor and the dentist's hand.

A limitation of the system described above lies in the relative positions of the light source and the center of the robot's motion. Just as the dentist must avoid turning completely around with the drill in his hand, the robot must be controlled in such a way that its movements do not cause the light directing arm to attempt to extent through the robot itself or its arm. The present invention eliminates this limitation by combining the light directing arm with the robot's arm in such a way that they move synchronously and, thus, are incapable of mutual interference.

Other developments in the field of the adaptation of robotic technology to laser applications are discussed in "Laser Processing at Ford", by Michael Yessik and Duane J. Schmaty, Metal Progress, May, 1975, pp. 210–215. Examples of manipulator systems are discussed in U.S. Pat. No. 3,937,057 issued to Trolle on Feb. 10, 1976 and U.S. Pat. No. 4,221,997 issued to Flemming on Sept. 9, 1980. Other robotic systems are disclosed in U.S. Pat. No. 4,260,319 issued to Motada et al on Apr. 7, 1981, U.S. Pat. No. 4,076,131 issued to Dahlstrom et al on Feb. 28, 1978 and U.S. Pat. No. 4,089,427 issued to Pardo et al on May 16, 1978. Inventions that relate particularly to actuators and joints for robots are discussed in U.S. Pat. No. 3,848,753 issued to Borg et al on Nov. 19, 1974, U.S. Pat. No. 3,777,618 issued to Iwai et al on Dec. 11, 1973 and U.S. Pat. No. 4,096,766 issued to Pardo et al on June 27, 1978.

The present invention, in its simplest form, comprises a joint which is rotatably attached to a support member or arm. A reflective member with a mirror surface is attached to the joint in such a way that the mirror surface is intersected by the axis of motion about which the joint rotates with respect to the support member. By adjusting the angle of the mirror surface with respect to this axis of motion, a collimated beam of light which travels along this axis of motion can be reflected by the mirror surface in any one of an infinite number of directions. When the reflective member is attached to the joint, a specific preselected angle of reflection is determined for the collimated beam of light. It should be apparent that, when the joint member is rotated about the axis of motion, the reflected beam of collimated light is moved in such a way that it describes either a flat or conical surface. When the mirrored surface is disposed at an angle of 45° to the axis of rotation, the reflected beam of collimated light will pass at an angle of 90° to the originating beam and, as the joint is rotated about its axis of motion, the reflected beam will describe a generally flat surface to which the axis of motion of the joint is perpendicular.

If the support member described above is a hollow tube with the joint member rotatably attached to one end, the beam of collimated light can be passed through the support member along its longitudinal axis. It should be understood that this longitudinal axis is also coincident with the axis of motion of the joint. It should be further understood that it is of prime importance to the proper application of the present invention that the beam of collimated light passes along the axis of motion of the joint member. This characteristic permits the joint to be rotated at any angle about the axis of motion while maintaining a clearly predictable path of the reflected laser beam. This attribute also permits an additional support member to be rigidly attached to the joint in such a way that it rotates with the joint about the axis of motion described above. This additional support member allows a second joint to be rotatably attached to it so that a mirror surface of a second reflective member can be positioned within the second joint in such a way that it is intersected by a second axis of motion which lies between it and the mirror surface of the first joint and along which the reflected laser beam passes.

The axis of motion of the optical joint is coincident with that of the robot arm to which it is attached. In a multi-jointed robot, each segment of the robot's arm is associated with a straight segment of the light beam. The arm segment and the beam segment move in synchronism. The robot arm can be attached to a tubular member and optical joint or, alternatively, these light-directing components can be incorporated within the robot arm itself.

It should be apparent that the present invention makes possible the passage of a collimated light beam along the articulated arms of a robot and more synchronously with it. It should further be understood that, by appropriate selection of type and number of the joints described above, a robot can be configured that is capable of delivering a laser beam to virtually any point within its geometric range and at virtually any angle to that point in space.

BRIEF DESCRIPTION OF THE DRAWING

The invention will be more fully understood from the following detailed description of the preferred embodiment, read in conjunction with the accompanying drawings, in which.

DESCRIPTION OF THE PREFERRED EMBODIMENT

The present invention relates generally to a light beam directing apparatus and, more specifically, to a joint, usable in conjunction with a robot, for directing the path of a collimated laser beam.

Figures 1, 2:
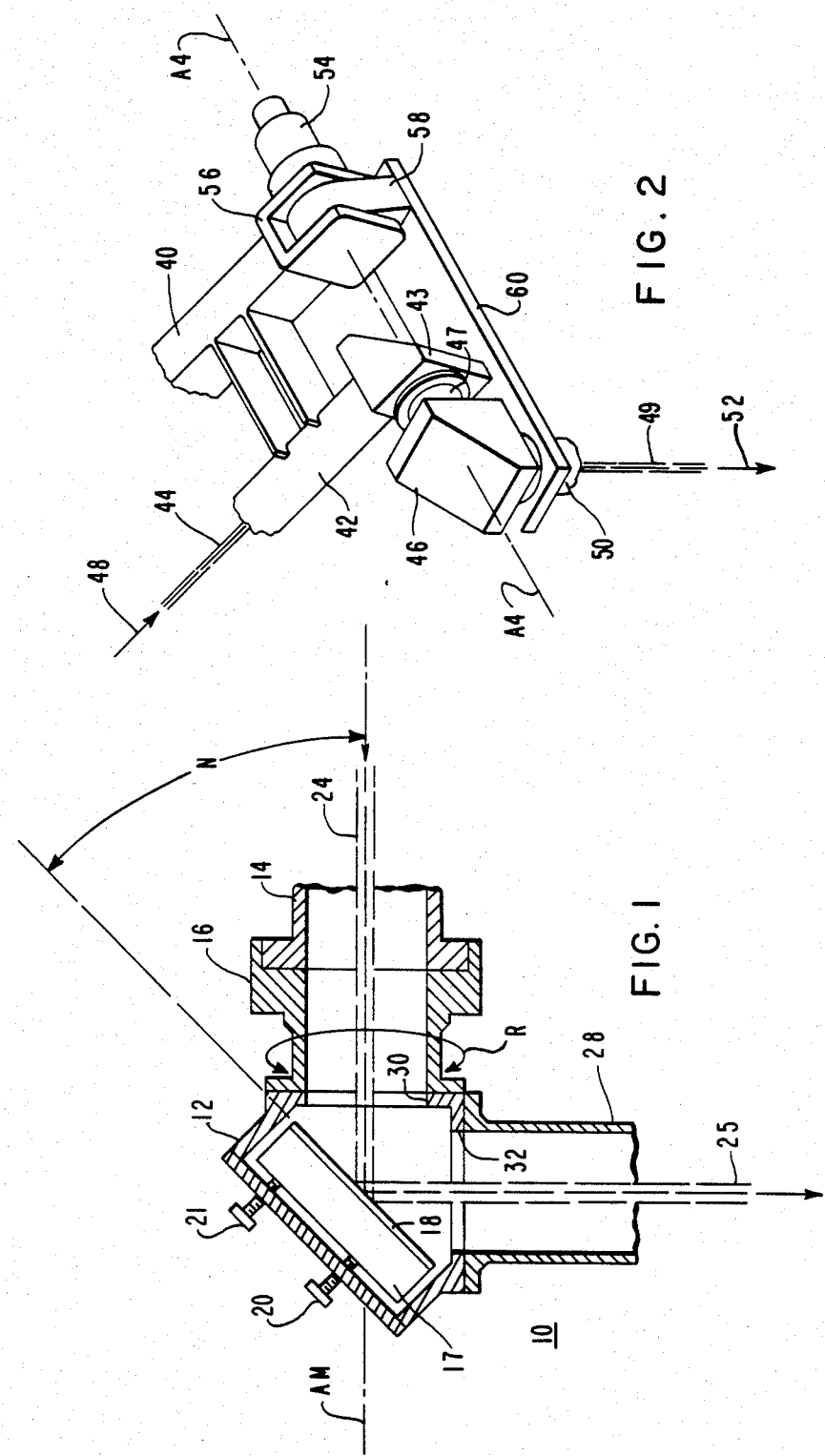
FIG. 1 is an optical joint made in accordance with the present invention.
FIG. 2 illustrates an optical joint of the present invention configured in alignment with a motor and support means.

FIG. 1 illustrates the optical joint of the present invention. The joint 10 comprises a frame member 12 which is rotatably attached to a support member 14. The frame 12 is shown in FIG. 1 as having a tubular extension 16 rigidly connected to it. It should be understood that this extension 16 could alternatively be made in integral portion of the frame 12 and that the illustration in FIG. 1 utilizes the extension 16 as a matter of design preference and not of necessity. The frame 12 and extension member 16 are shown to be rotatably mounted on the support member 14. The frame 12 is mounted in such a way that it can rotate about an axis of motion AM.

Within the frame structure 12, a reflective member 17 is disposed. The reflective member 17 has a mirror surface 18 which is positioned in such a way that the axis of motion AM passes through it. The reflective member 17 is provided with a means for adjusting its position within the frame 12. In FIG. 1, this adjusting means is shown as a pair of threaded members, 20 and 21, which can be adjusted in order to change the position of the reflective member 17 and its mirror surface 18 with respect to the axis of motion AM of the frame member 12.

The frame member 12, as shown in FIG. 1, can rotate about the support member 14 as shown by the arrow R. If a collimated beam of light 24 is caused to extend along the axis of motion AM and strike the mirror surface 18, a reflected beam of light 25 will result. Since the angle of incidence equals the angle of reflection, an angle N of 45° between the mirror surface 18 and the axis of motion AM will result in a reflected beam 25 which is at right angles with the incident beam 24. It should be understood that, although other values of angle N should be considered within the scope of the present invention, a right angle between the incident beam 24 and reflected beam 25 is convenient for this discussion and will be utilized herein.

As the frame member 12 is rotated about its axis of motion AM, the reflected beam 25 will be swept around the axis of motion AM in such a manner so as to describe a flat planar surface. Depending on the amount of rotation of the frame 12 and extension member 16 about the axis of motion AM, the reflected beam 25 can be positioned in any one of an infinite number of lines extending radially from the mirror surface 18.

FIG. 1 also shows a tubular member 28 connected to the frame 12. As will be described in greater detail below, this tubular member 28 can be utilized as a support member for another frame and reflective member in the same manner as the support member 14 is utilized to provide rotating support for the frame 12 and reflective member 17 shown in the figure. Thus, it should be apparent that a plurality of joints such as the one shown in FIG. 1 can be combined together in order to direct a collimated beam of light in a particular preselected direction. It should be understood that, as long as the incident light beam 24 is directed along the axis of motion AM of the mirror surface 18, its corresponding reflective beam 25 can be reflected in any of an infinite number of directions. The frame member 12 of FIG. 1 is also shown as having an inlet opening 30 and an outlet opening 32 positioned in such a way that they combine to allow passage of the incident 24 and reflected 25 light beams through the frame member 12.

FIG. 2 illustrates the application of the present invention at an exemplary one of a plurality of joints of a robotic system. A main support member 40 provides mechanical support for the entire joint assembly. As shown in FIG. 2, the main support member 40 is directly attached to a tubular member 42 which, in turn, provides support for a joint member 43 which comprises a mirror surface (not shown in FIG. 2 but illustrated in detail in FIG. 1) within it. The joint member 43, as utilized in the exemplary system shown in FIG. 2, is not rotatably mounted to the tubular member 42 but, instead, serves only to reflect the incident light beam 44 at a right angle to its original path. Comparing FIG. 1 to FIG. 2, the joint structure 43 of FIG. 2 is analogous to the frame 12 in FIG. 1. Also, the tubular connecting member 47 which is shown in FIG. 2 disposed between joints 43 and 46, is analogous to the stationary support member 14 of FIG. 1. In other words, the most basic elements of the present invention are shown in FIG. 2 as being the joint 46 applied in conjunction with the support member 47. It should be understood that, as illustrated in FIG. 2, the optical joint of the present invention is applicable for use with other somewhat similar joints in order to facilitate the direction of a collimated light beam in any one of an infinite number of directions.

The incident light beam 44 in FIG. 2 travels from its source in the direction of arrow 48 through the tubular member 42 and strikes a mirror surface within the joint 43 which is positioned at an angle of 45° to the direction of the incident light beam 44. The light beam is then reflected from that mirror surface along axis A4. The light beam then travels, along axis A4, toward a mirror surface within joint 46. This light beam, as it travels from joint 43 to joint 46, passes through the support member 47 located therebetween. Within joint 46, a mirror surface which is positioned at a 45° angle to axis A4 reflects the light beam at an angle of 90° to that axis. This reflected light beam 49 travels through an opening in joint 46, through a tubular member 50 and continues in the direction shown by the arrow 52. Although the joint components shown in FIG. 2 are not sectioned, for reasons of clarity, it should be understood that the resulting path of the light beam enters the tubular member 42 in the direction shown by arrow 48, impinges a mirror surface within joint 43 and is reflected along axis A4, passes through the tubular support member 47, impinges another mirror which is located in joint 46 and is reflected, at a 90° angle from axis A4 in the direction shown by arrow 52.

FIG. 2 also illustrates the application of a motor 54 which is applied in such a way so as to cause the rotation of the joint 46 about the axis A4. The main support member 40 is attached to a yoke 56 which is rotatably associated with a pivotal member 58. The motor 54 is rigidly attached to the yoke member 56 and connected to the pivotal member 58 in such a way that the motor 54 can exert a rotational force on the pivotal member 58 and its attached platform 60. As shown in FIG. 2, the platform 60 is rigidly attached to the optical joint 46. This configuration enables the motor 54 to cause the joint 46 to rotate about axis A4. As described above, this attribute is important to the proper functioning of the present invention.

FIG. 2 is also illustrative of the relationship of the support arm 40 and the straight section of the light beam 44 which extends in the direction of arrow 48 and impinges the mirror surface within the optical joint 43. The support arm 40 and the tubular member 42 are rigidly attached together and therefore move synchronously. When applied to a robotic system which employs an arm with a plurality of rigid segments, each segment would be similarly attached to optical components which maintain a light path in constant geometric relationship with the arm segment. Also, the light beam will be deflected, at an optical joint, at a point along the axis of movement of the arm's joint so that each arm segment moves synchronously with its associated light beam segment.

Since the optical joint 46 rotates about the axis A4 and the light beam extends along axis A4, the light beam will strike a point on the mirror surface within joint 46 and this point will remain constant regardless of the rotation of joint 46 about axis A4. Therefore, the reflected light beam 49 will remain in a constant geometric relationship with the joint 46 regardless of its rotational position about the axis A4.

It should be understood that, although the joints 43 and 46, which are shown in FIG. 2 have not been shown in sectioned views, their internal parts functionally identical to that shown in FIG. 1. Each has a reflective member which has a mirror surface thereon and each reflective member is adjustable within its respective frame member.

Figure 3:
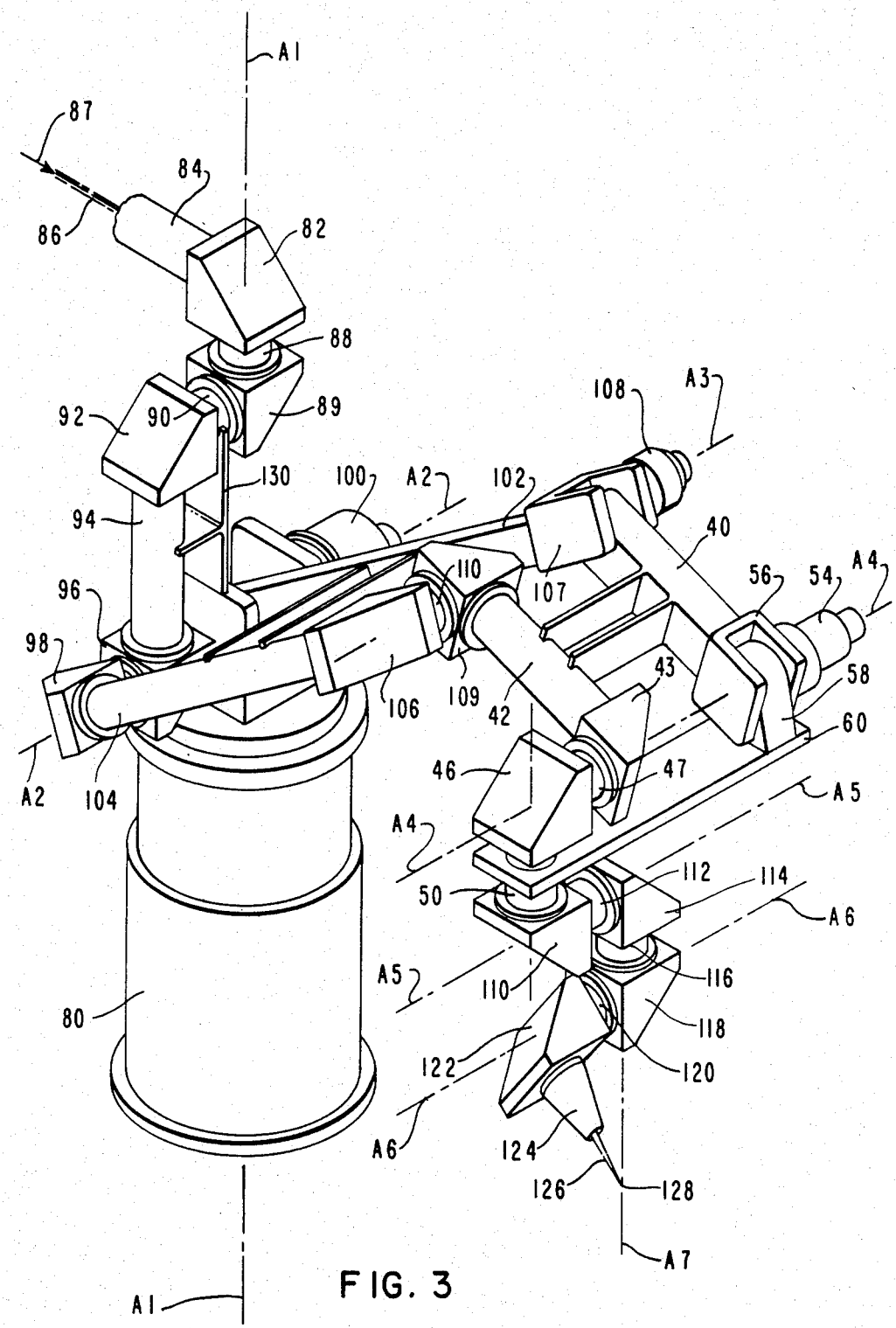
FIG. 3 shows a robot utilizing a plurality of optical joints made in accordance with the present invention.

FIG. 3 shows a robot which utilizes a plurality of optical and mechanical joints. The exemplary robot illustrated in FIG. 3 has a base 80 which is rigidly fastened to a surface such as shop floor. The robot comprises a number of pivotally connected arms which are rotatably associated with the base 80. The robotic system also comprises a stationary optical joint 82 along with a tubular member 84 connected to it. It should be understood that the base member 80, the optical joint 82 and its tubular member 84 all remain stationary during the operation of the robot. The rest of the pivotally connected arms and associated support members of this robotic system illustrated in FIG. 3 are free to be rotated about axis A1.

A collimated beam of light 86 is introduced into the robotic system in the direction of arrow 87. This light beam 86 passes through the tubular member 84 and into the joint 82. It should be understood that each of the optical joints shown in FIG. 3 comprises an internal reflective member having a mirror surface thereon. In this example, each of the optical joints has its mirror surface positioned at an angle 45° to its respective incoming light beam. This geometric configuration provides a 90° angle of reflection between each optical joint's incident and reflective beams of light. Therefore, as the passage of the light beam is described with respect to the illustrated robot in FIG. 3, it should be understood that at each optical joint the light beam will be reflected at 90° angle between its incident and reflected paths.

The light beam 86 which enters the joint 82 is reflected downward, along axis A1, through the tubular member 88 and into joint 89. As illustrated, joint 89 is rotatably connected to the tubular member 88 in such a way that it is able to rotate about axis A1. The light beam, when it strikes a mirror surface within joint 89, is reflected through the support member 90 and into joint 92. Since axis A1 is shown to be vertical in FIG. 3 and the light beam 86 enters the tubular member 84 in a horizontal direction, the beam is traveling in a horizontal direction as it passes from joint 89 to joint 92.

Since the light beam is traveling along the axis A1 as it strikes the mirror surface of joint 89, its point of incidence upon the mirror surface remains constant as joint 89 rotates about axis A1. It should be understood that this passage of the incident light beam along the axis of rotation of the joint and its mirror surface is an important element of the present invention in that it maintains the constancy of location of the point at which the light beam strikes the mirror surface regardless of the rotational position of the joint 89. Therefore, the reflected light beam, which in this case travels from joint 89 to joint 92, remains in a constant position with respect to the mirror surface and joint 89. After passing into joint 92 and striking its reflective surface, the light beam is deflected vertically downward through tubular member 94 and into joint 96. As can be seen from FIG. 3, joint 92, tubular member 94 and joint 96 are rigidly attached to each other and move as a single body. Therefore, it should be understood that this rigidly attached combination of joints and tubular member does not employ the basic elements of the present invention. Instead, they serve to translate the passage of the beam from its horizontal direction between joints 89 and 92 to a lower position. The vertically descending beam which passes through tubular member 94 into joint 96 is deflected by that joint's reflective member, in a horizontal direction, through an intermediate tubular member into joint 98. The light beam which passes from joint 96 to joint 98 travels along axis A2 which is also the axis of motion of joint 98. This rotation of joint 98 is caused by the motive force of motor 100 whose axis of rotation is coincident with the axis A2. Therefore, it should be understood that the passage of the light beam between joint 96 and 98 is in a horizontal plane, in which axis A2 lies, which is parallel to a horizontal plane in which the initial light beam 86 travelled as it entered the tubular member 84. Both of these horizontal planes are, of course, perpendicular to the axis of motion A1 about which the movable components of the robot rotate. As the movable components of the robot revolve about axis A1, the horizontally traveling light beam between joints 96 and 98, while remaining in its constant horizontal plane, travels away from axis A1 in varying angular directions.

Rotation of the motor 100 results in a movement of support arm 102 and tubular member 104 about a point of rotation located on axis A2. As the light beam exits from joint 98 at an angle of 90° from axis A2, it travels through the tubular member 104 into joint 106. It should be understood that as the tubular member 104 rotates due to the action of motor 100, the support arm 102 with its yoke member 107 also rotate about axis A2 in such a way that the motor 108 constantly remains aligned with joint 106, with axis A3 passing through both of these components. The axis of rotation of motor 108 and joint 106 both lie on axis A3 and the beam of light which is reflected by the mirror surface of joint 106 into joint 109 travels along this axis A3 also. As the light beam passes from joint 106 to joint 109, along axis A3, it passes through an intermediate member 110 which can be rotatably connected to either joint 106 or joint 109 and rigidly connected to the other. Although joint 106 is rigidly attached to the tubular member 104, joint 109 is free to rotate about axis A3 due to the rotation of motor 108. As can be seen in FIG. 3, rotation of motor 108 causes support arm 40 and tubular member 42 to revolve about axis A3.

It should be apparent that axis A4 and its associated components are identical to those components shown in FIG. 2. As described above with reference to FIG. 2, motor 54, which is attached to pivotal member 58 causes the rotation of joint 46 about axis A4 due to the connection between pivotal member 58 and joint 46 through the platform member 60. The light beam traveling from joint 106 to joint 109 is reflected at an angle of 90° to axis A3 and passes through tubular member 42 before striking a mirror surface on a reflective member within joint 43. As described above, the light passing into joint 43 is reflected through tubular member 47 into joint 46 where it is deflected at an angle of 90° to axis A4 and passes through the tubular member 50.

The robot shown in FIG. 3 also comprises optical joints 110, 114, 118 and 122 as shown. These optical joints which comprise tubular members 112, 116 and 120 therebetween are rotatably connected to each other, but are not necessarily automatically driven in a relative rotational direction during the operation of the robot shown in FIG. 3. These optical joints can be motor driven during operation but also may be fixed at specific rotational positions relative to their adjoining optical joints. This choice will depend on the particular application of the robot. With this in mind, it should be understood that optical joints 114 and 118 can revolve relative to each other about axis A7 and optical joints 118 and 122 can rotate with respect to each other about axis A6.

As the light beam passed from its entry point into tubular member 84, through all of the intermediate tubular members and optical joints and finally into joint 122, the light beam is collimated and maintains an essentially constant cross section. However, in order to be functionally useful, the light beam 126 must be focused at a point of application 128. This focusing of the collimated light beam 86 into a focused light beam 126 is accomplished by appropriate focusing lenses located within the focusing member 124. It should be understood that the specific type of focusing mechanism utilized within focusing member 124 is not a critical element of the present invention and a robot made in accordance with the present invention can utilize many methods of focusing within its scope. Included among these various focusing methods is the use of a parabolic reflective surface arranged to provide a 90 degree off-axis arrangement known to those skilled in the art. Of course, it should be understood that the specific focusing apparatus will be a function of the particular application in which the present invention is utilized.

In FIG. 3, the present invention can be seen applied in several distinct examples. The optical joint 89 is rigidly attached to the robot arm 130 and its incident light beam lies on the axis A1 which is the axis of motion of both the arm 130 and the optical joint 89. This main axis A1 of the robotic system shown in FIG. 3 is only one of several exemplary illustrations of the present invention. At each rotational axis of motion the basic elements of the present invention can be seen. These elements comprise the synchronous association of an optical and a mechanical joint, a reflective surface disposed within the optical joint and the constant geometric relationship between the robot arm and a segment of the beam of collimated light impinging upon the reflective surface.

Figure 4:
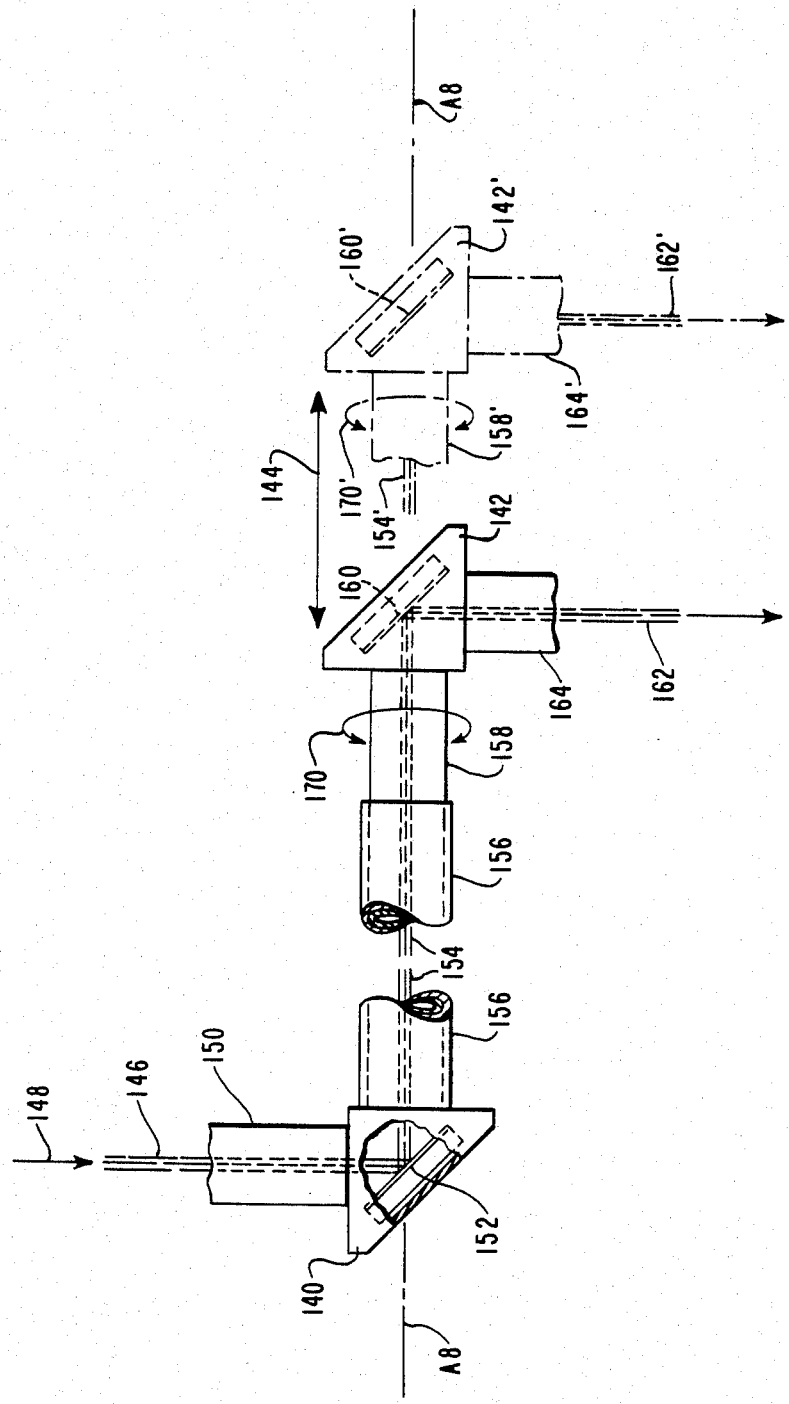
FIG. 4 illustrates an optical joint made in accordance with the present invention and attached in slidable association with a support arm.

FIG. 4 illustrates another embodiment of the present invention. It comprises two optical joints, 140 and 142, which are disposed in axially displacable relationship with each other. Assuming that joint 140 is fixed in space, joint 142 can move either toward or away from joint 140 along its axis of motion A8 in the directions shown by arrow 144. In other words, joint 142 can alternatively assume the positions shown by reference numerals 142 and 142', inter alia. When a collimated incident light beam 146 passes, in the direction of the arrow 148, through a tubular member 150 into joint 140, it strikes a reflective member 152 and is reflected at an angle of 90° along light beam 154. This light beam 154 passes through a tubular member 156, along axis of motion A8, and into joint 142. As can be seen in FIG. 4, joint 142 is rigidly attached to a tubular member 158 and tubular member 158 is associated in sliding relation with tubular member 156. As these two slidably associated tubular members move axially with relationship to each other in the direction shown by arrow 144, joint 142 moves either toward joint 140 or away from it. As long as the reflective member 160 of joint 142 is positioned at a constant angle of 45° to the light beam 154, the resulting reflecting light beam 162 passes from the reflective member 160, out of the optical joint 142 and through the tubular member 164 in a direction which is at an angle of 90° to the light beam 154. Therefore, as the optical joint 142 moves in this axial relationship with optical joint 140, the resulting deflected light beam 162 will move in a linear path. It should be understood that the joint 142', which is shown by a dashed line in FIG. 4, and its associated components which are designated with similar primed reference numerals represent an alternative position of this optical joint.

The configuration in FIG. 4 could also include a rotatable association of tubular member 158 with tubular member 156. This rotatable association could permit the optical joint 142 and its attached tubular member 158 to rotate with respect to tubular member 156 as shown by arrow 170. As long as the light beam 154 travels along an axis of motion A8 which is also the axis of motion of the optical joint 142, the reflected light beam 162 will remain in fixed relationship relative to joint 142 and can be utilized in combination with other similarly constructed joints as described above. Although the specific embodiment of the present invention shown in FIG. 4 utilizes both axial and rotational movements of the joint 142, it should be clearly understood that these movements need not both occur in a beam delivery system made in accordance with the present invention. For example, a beam delivery apparatus made in accordance with the present invention could employ one or more rectilinear axes with no rotational axis or with a plurality of rotational axes (as illustrated in FIG. 3) and no rectilinear axis. It should be understood that the use of the term "axial" herein refers to applications in which the optical joint moves in a direction parallel to its incoming light beam.

The configuration shown in FIG. 4 illustrates an alternative embodiment of the present invention which permits axial movement of its optical joint. As long as the incident light beam lies on the axis of motion A8 of the optical joint, the present invention will function properly. This axis of motion can be one of either axial or rotational motion, or a combination thereof. It should be understood that, although no motors are shown in FIG. 4, the present invention anticipates their being disposed in such a way as to cause the optical joints of the present invention to move about an axis of motion A8 which lies coincident with a beam of collimated light which impinges the mirror surface of the optical joint of the present invention.

It is important to understand that the optical joint of the present invention can be applied to many functionally different apparatus as long as its basic elements are maintained. An optical joint made in accordance with the present invention has a reflective member attached to its frame member in such a way that an incident beam of light entering the optical joint strikes the mirror surface and is reflected therefrom. Furthermore, the incident beam of light which enters the optical joint of the present invention travels along a line which is also the axis of rotation or axial translation of the frame member of the joint. This characteristic results in the incident light beam striking a constant point on the mirror surface regardless of its rotational or axial displacement about the axis. The advantage of this constant point is that, the deflected light beam remains in a constant position relative to the rotating or axially displacing optical joint and its position in space can be accurately determined. Without this constancy of the location of this point, the resulting movement of the light beam can be different in both velocity and magnitude from the movement of the optical joint.

Throughout the discussion above, the term "axis of motion" has been used to describe the path along which the beam of collimated light must travel. It should be understood that this term can equally refer to an axis of rotation or an axis of rectilinear motion. In applications where the optical joint is rotational, the axis of motion is the joint's axis of rotation and the incident beam of light must travel in a path coincident with it. Whereas in an application where the motion of the optical joint is rectilinear, the axis of motion is the joint's axis of axial motion along which it travels. In the latter case, the beam of light must pass along the axis also, but it should be apparent to one skilled in the art that, in rectilinear applications, the axis of motion can lie along one of many parallel lines. Therefore, the term "axis of motion" can have different definitions, depending on the specific type of joint movement. The light path in a rotational application must lie directly along the joint's axis of motion (i.e. its axis of rotation) for proper operation of the present invention. However, since more than one axis of motion (i.e. axis of rectilinear travel) can be defined in rectilinearly applied joints, the light beam may lie on any path which is parallel to the joint's direction of motion and which permits the beam to impinge on the joint's mirror surface. Therefore, it should be understood that the term "axis of motion" used herein should be taken to mean either an axis of rotation or an axis of rectilinear movement, depending on the particular application of the present invention.

It should be apparent that the present invention provides a means for directing a collimated beam of light throughout a path described by supporting arms which can move in varying angular relationship with each other. In a robotic system which incorporates a plurality of arm segments, this attribute essentially directs the light beam along a reflected path which is coincident or parallel with with the arm segments of the robotic system and each segment of the light beam moves in synchronism with an associated arm segment. Furthermore, it should be apparent that the present invention makes possible the complete enclosure of the collimated light beam in such a way that the light beam can be protected from interference from airborne impurities such as dust. Although the present invention has been described with considerable particularity in the discussion above and in the figures, it should be understood that it should not be considered to be so limited. Other embodiments of the present invention which employ the basic elements discussed above are to the considered to be within its scope.

What I claim is:

1. In combination with a robotic system having one or more mechanical joints defining at least in part a first axis of motion and a second axis of motion, which axes of motion define a contoured path through the robotic systems geometric range of motion, wherein each of said mechanical joints defines in part a frame member; an integral laser beam delivery system for the delivery of a beam along any point within said geometric range of motion comprising:
   an optical joint having a housing with a reflective surface disposed therein mounted on the frame member of each said mechanical joint so as to be in synchronous association with each said mechanical joint;
   a tubular member disposed between adjacent optical joints and through which tubular member the beam passes as it travels from optical joint to optical joint, said tubular member being rigidly attached between the frame member of each mechanical joints with which said adjacent optical joints are in synchronous association, wherein said reflective surface establishes a constant geometric relation between a segment of the beam impinging on said reflective surface and the axes of motion associated with said mechanical joints whereby the optical joints along with the tubular members dispose therebetween and each axis of motion are synchronous and incapable of mutual interference.

2. The combination with a robotic system of claim 1, further comprising:
   means for producing a collimated beam of light, extending from a first point at said producing means to a second point on said mirror surface, said joint member being attached to said support member in such a way that said joint member is movable about a preselected axis of motion, said axis of motion extending from said first point to said second point.

3. The combination with a robotic system of claim 2, further comprising:
   means for focusing said collimated beam of light to a focal point which is a preselected distance from said joint member.

4. The combination with a robotic system according to claim 1 wherein at least one of the axes of motion is rectilinear.

5. The combination with a robotic system according to claim 1 wherein at least one of the axes of motion is rotational.

6. The combination with a robotic system according to claim 1 wherein at least one of the axes of motion is both rectilinear and rotational.

7. A laser beam delivery system, for use in combination with a robot comprising:
   a support member;
   an optical joint slidably attached to said support member in such a way as to be movable along an axis of motion, said axis of motion defining both an axis of rotation about which said optical joint is rotatable and an axis of rectilinear movement along which said optical joint is axially movable;
   a motor attached to said optical joint whose rotor is coaxial with said axis of rotation for effecting the movement of said optical joint about said axis of motion; and
   means for causing said optical joint to move about said axis of rectilinear movement operatively associated with said optical joint, said means for causing comprising a device whose direction of linear motion is parallel to said axis of rectilinear movement, wherein said optical joint has a mirror surface therein, said mirror surface being disposed in such a way as to be intersected by said axis of motion, said mirror surface being adjustable relative to said optical joint.

8. The laser beam delivery system for use in combination with a robot according to claim 7 wherein the optical joint includes a frame member relative to which frame member the mirror surface is adjustable by means of adjusting means.

9. The laser beam delivery system for use in combination with a robot according to claim 8 wherein the adjusting means comprise at least one threaded member connected in threaded association with the frame member.

* * * * *